United States Patent [19]

Calvignac et al.

[11] Patent Number: 5,557,608
[45] Date of Patent: Sep. 17, 1996

[54] METHOD AND APPARATUS FOR TRANSMISSION OF HIGH PRIORITY TRAFFIC ON LOW SPEED COMMUNICATION LINKS

[75] Inventors: Jean Calvignac, La Gaude; Claude Galand; Didier Giroir, both of Cagnes sur Mer; Gerald Lebizay, Vence; Daniel Mauduit, Nice; Victor Spagnol, Cagnes sur Mer, all of France

[73] Assignee: International Business Machines Corporation, Armonk, N.Y.

[21] Appl. No.: 446,997

[22] Filed: May 22, 1995

[30] Foreign Application Priority Data

May 25, 1994 [EP] European Pat. Off. ............. 94480047

[51] Int. Cl.$^6$ .................................................. H04L 12/56
[52] U.S. Cl. .......................... 370/60; 370/85.6; 370/94.1
[58] Field of Search .............................. 370/58.1, 58.2, 370/58.3, 60, 60.1, 61, 79, 85.6, 85.7, 94.1, 94.2, 95.1, 99, 112, 118; 340/825.5, 825.51, 825.52

[56] References Cited

U.S. PATENT DOCUMENTS

| | | | |
|---|---|---|---|
| 4,500,987 | 2/1985 | Hasegawa | 370/60 |
| 4,510,599 | 4/1983 | Ulug | 370/85.6 |
| 4,707,693 | 11/1987 | Hessel | 370/85.6 |
| 4,761,781 | 8/1988 | Calvignac et al. | 370/94.1 |
| 4,819,230 | 4/1989 | Calvignac et al. | 370/94.1 |
| 5,051,946 | 9/1991 | Cubanich et al. | 364/900 |
| 5,343,473 | 8/1994 | Cidon et al. | 370/85.6 |

FOREIGN PATENT DOCUMENTS 0512290 11/1992 European Pat. Off. .
0582537 2/1994 European Pat. Off. .

OTHER PUBLICATIONS

IBM Technical Disclosure Bulletin vol. 37, No. 2A, Feb. 1994, New York US pp. 243–245 'MAC layer handling of preemptive and nonpreemptive priorities in buffer insertion LANS' *the whole document*.

Primary Examiner—Alpus H. Hsu
Attorney, Agent, or Firm—Gerald R. Woods

[57] ABSTRACT

In a packet switched communications system an incoming real-time packet is imbedded after the next block of data of the non-real-time packet being transmitted. This object is accomplished by transmitting each packet along with at least a 1-byte trailer which is used to indicate the packet type, whether the current block of non real time data is preempted or whether the current block of non real time data is resumed.

9 Claims, 8 Drawing Sheets

METHOD AND APPARATUS FOR TRANSMISSION OF HIGH PRIORITY TRAFFIC ON LOW SPEED COMMUNICATION LINKS

FIELD OF THE INVENTION

This invention relates to telecommunications networks and more particularly to an improved preempt/resume protocol for low-speed communication links in a fast packet switching network.

BACKGROUND OF THE INVENTION

In a digital transmission network, data from a large number of users are serially transmitted from one network node to another network node, up to their respective final destinations.

Due to the evolution of networks towards more and more complex mixtures of sub-networks with heterogenous architectures, it is clear that there will be a future requirement to support distributed computing applications across high speed backbones that may be carrying LAN traffic, voice, video and traffic among channel-attached hosts and work stations. Perhaps the fundamental challenge for high speed networking is to minimize the processing time within each node in the network.

Packet switching is now commonly used to accommodate the bursty, multiprocess communication found in distributed computing environments. To accomplish this, packets carrying bursty data traffic can be assigned a non-real-time priority, while packets carrying voice and video traffic can be assigned a higher, real-time priority. A node in a fast packet switching network contains buffers for holding packets waiting for transmission on its communication links. Packets waiting for transmission can be held in buffers managed differently, depending on the priority, assigned to the packets.

European patent application (582537) discloses a communication network having communication nodes which can adopt a number of different service policies in order to transmit packets from different priority buffers, for instance, priority with no preemption, preemption with retransmission, and priority with resume. When no preemption is used, the packet priority is only examined to determine from which buffer to select the next packet for transmission. If a high-priority packet is placed in the buffer while a low-priority packet is being transmitted, the high-priority packet must wait until the current transmission is completed. A preemption with retransmission service policy means that the node will abort the transmission of a low-priority packet upon the arrival of a high priority packet and transmit the high-priority packet. Once all high-priority packets have been transmitted, transmission of the preempted low-priority packet will be restarted from the beginning of the packet. A preemption with resume service policy is similar except the preempted low-priority packet is restarted from the point of interruption rather than the beginning. The selection of the appropriate service policy is dependent on the characteristics of the communication link, the delay requirements of the high-priority packets, and the size of the low-priority packets.

The typical scheme used for transmitting packetized information over low speed communication links (T1 at 1.544 megabits per second) is based on the HDLC MAC-layer protocol, described, for example, in H. NUSS-BAUMER: TELEINFORMATIQUE I, Presses Polytechniques Romandes, 1987, pages 301–313.

Both the priority with no preemption and the preemption with retransmission service policies can be implemented using the existing HDLC MAC-layer protocol. For preemption with resume service policy, a modified HDLC MAC-layer protocol is described wherein three types of flags are used to delimit packets for allowing high-priority packets to temporarily preempt low-priority packets. The HDLC starting, ending or idle flag is defined as the 8-bit sequence B'01111110'(X'7E'). The start preempt flag is defined as the 9-bit sequence B'011111110' and the end-preempt flag is defined as the 10-bit sequence B'0111111110'. All flags are on byte boundaries with respect to the packet data that they delineate.

This definition requires that the hardware is capable of scanning the incoming bit stream, of recognizing special non-standard flags in addition to the HDLC flags, and of running a protocol to verify a set of rules upon detection of these flags. Clearly, special hardware is necessary for that purpose.

OBJECTS OF THE INVENTION

It is a principal object of the invention to provide a method and an apparatus for embedding high-priority traffic in low-priority traffic for serial transmission through low speed communication links, without a delay incurred by having first to complete transmission of a low-priority traffic.

It is another object of the invention to preempt low-priority packet traffic with at least one high priority packet and later resume transmission of the preempted low-priority packet automatically, using an output adapter built with off-the-shelf scanners.

It is another object of the invention to allow a mode of operation that is compatible with the HDLC MAC-layer protocol.

BRIEF SUMMARY OF THE INVENTION

According to the invention an incoming real-time packet is imbedded after the next block of data of the non-real-time packet being transmitted.

This object is accomplished by transmitting each packet along with at least a 1-byte trailer which is used to indicate the packet type, whether the current block of non real time data is preempted or whether the current block of non real time data is resumed.

BRIEF DESCRIPTION OF THE DRAWINGS

The invention will be described with respect to a preferred embodiment thereof, which is further shown in the drawings in which.

DETAILED DESCRIPTION OF PREFERRED EMBODIMENT OF THE INVENTION

A packet-switching network usually consists of switching nodes and communication links or trunks between these nodes. Each of those nodes is linked to at least one other node through one or more communication links. The switching nodes are data processing systems including transmit/receive adapters connected to the communication links. At each node, incoming data packets are selectively routed to one or more of the outgoing communication links terminated at another node. Such routing decisions are made in response to information in the header of the data packet.

In a packet switching network, packets are pieces of data, which are prefixed with headers containing control and routing information that identifies the originating and destination users. Each node examines each header and decides where to send the packet to move it closer to its destination.

A basic requirement of high speed networks is to selectively process data according to different classes of services, which are generally specified in terms of probability of loss and maximum end-to-end delay. This class of service may be specified by some bits in the header, which are decoded at intermediate nodes to select the buffering policy.

Delay priorities are specified among three classes of traffic. At each output trunk adapter, packets from each class share a different logic buffer before being transmitted over the trunk. These classes are:

Real-time traffic (voice, video),

Non-real-time traffic (data),

Non-reserved traffic (datagram).

Figure 1:
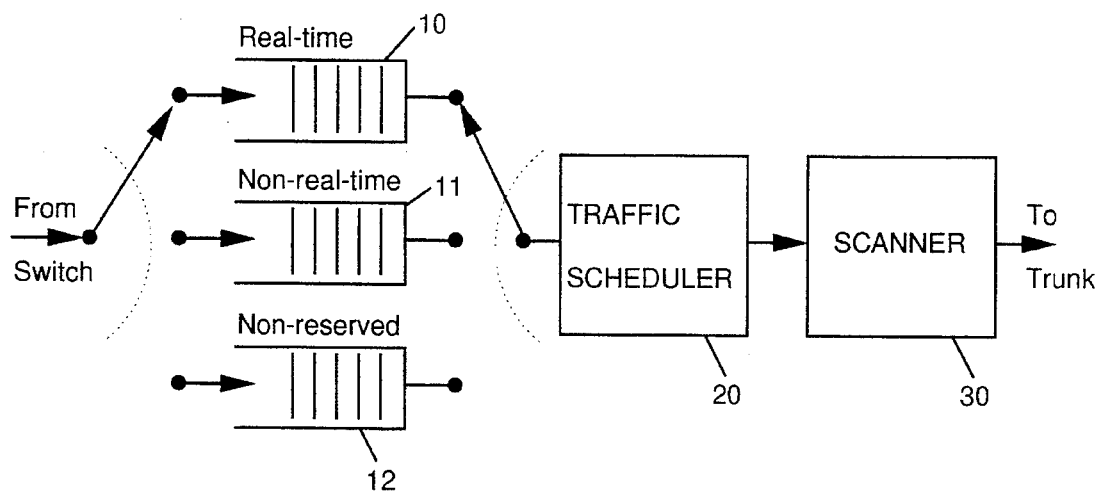
FIG. 1 is a block diagram representing the output adapter of a node of a network within which the invention may be practiced.

FIG. 1 represents the output adapter structure, featuring three buffers 10, 11, 12, a scheduler 20, and a scanner 30. Packets received from the switch are stored in one of the buffers, according to their class, and the scheduler implements a policy to forward these packets to the output trunk. The scanner implements the low-level functions of the DLC protocol (frame synchronization, 0 insert/delete, CRC). The scheduler implements the preempt/resume protocol which will be described later.

Real-time traffic is given priority over non-real-time traffic in order to reduce its delay. Both real-time and non-real-time traffics are given priority over non-reserved traffic in order to minimize the impact of non-reserved traffic on the bandwidth reservation mechanism. For the sake of convenience, both non-real-time traffic and non reserved traffic will be considered as low priority traffic. Within each class, the packets are served in sequence, that is in the same order they arrived. Depending on the trunk speed, the scheduling policy is either preemptive or nonpreemptive.

In the case of non-preemptive policy, the buffer with the lower priority class is served only if the buffer with the highest priority class is empty, and the service of the low priority packets is not interrupted even when a high priority packet arrives before the end of the service.

This policy is used on all links for which the service time of a maximum-length non-real-time packet is less than 1.5 ms. For example, a T3 link supporting 2 Kbyte maximum length packets would use a nonpreemptive policy (0.3 ms maximum service time).

In the case of a preemptive resume policy, the buffer with the lower priority class is served only if the buffer with the highest priority class is empty, and the service of the low priority packets is interrupted when a high priority packet arrives before the end of the service. The service of the low-priority packet is resumed after the high-priority packet has been served.

This policy is used on all links for which the service time of a maximum-length non-real-time packet exceeds 1.5 ms. For example, a T1 link supporting 2 Kbyte maximum length packets would use a preemptive with resume policy (10 ms service time).

This low speed interface uses the standard HDLC protocol: the X '7E ' flag indicates the starting/ending of a packet. This flag is a shared starting and ending flag, i.e. one flag between packets, that defines byte alignment and is also sent during idle periods. Having the X'7E' flag define byte alignment means that all packets using the network basic packet format are an integer number of bytes in length.

The HDLC receiver looks for the X'7E' bit pattern to synchronize the starting/ending of a packet. To assure that this bit pattern does not appear in the packet, zero bit stuffing is used within the packet. The HDLC transmitter inserts an extra 0 bit after each occurrence of five 1's in the data to be transmitted. The HDLC receiver monitors the bit stream for a pattern of five 1's. If the sixth bit is a zero, then it is deleted. If the sixth bit is a one, the seventh bit is a zero, and it is byte aligned, then this is a X'7E' flag. If the X'7E' flag is not byte aligned, then it is an abort flag, a non-aligned X'7E'.

A node must always be able to send and receive link-initialization and link liveness messages. These messages are only sent using the basic packet format for low-speed bit level interfaces.

The decision of whether to use preempt/resume protocol and HDLC frame format is made during link-initialization. If both nodes agree to support connection oriented LLC, the HDLC frame format is used. In the HDLC frame format, data is sent using Information frames and link state transition exchange is sent using Unnumbered Information frames.

In the system described in the prior art, the preempt/resume protocol uses a couple of special flags:

'01111110': Starting preempt flag

'011111110': Ending preempt flag

Both flags are byte aligned.

Let's assume that a non-real-time packet is ready to be transmitted at time t1, and that no real-time packet is ready to be transmitted. Then, the transmission of the non-real-time packet can begin at time t1. Now assume that a real-time packet arrives at the output trunk at time t2 before the end of the transmission of the non-real-time packet. The packets are sent from the queue to the trunk adapter on a byte basis, and a real-time packet can be inserted after any byte of a non-real-time packet, provided it is encapsulated between a starting preempt flag (SP) and an ending preempt flag (EP). During the reception of the packet, the receiver looks for the starting preempt flag. Upon detection of this flag, it checks the validity of the detection, and eventually starts receiving the real-time packet that has been imbedded within the non-real-time packet. It also continues looking at the received bits, detects the ending preempt flag, then checks the validity and resumes the reception of the non-real-time packet.

The validity of the preemption is defined by the following set of rules:

X'7E' defines byte alignment.

Six 1's preceded by a 0 that is not byte-aligned is an invalid code.

Nine 1's preceded by a 0 that is not byte-aligned is an invalid code.

Receipt of an invalid code aborts the current packet and subsequent packets, until X'7E'.

Must verify that the preempted packet is a non-real-time packet (C1 bit of control byte 1 in the network header must be 1).

Must verify that the packets received during preemption are real-time packets (C1 bit of control byte 1 in the network header must be 0).

Cannot preempt a non-real-time packet before first byte is transmitted, because first byte is used to determine if the packet is real-time or non-real-time.

The invention will now be described with reference to FIG. 2. It is easy to observe that in any case, the real-time traffic can support a small delay before being scheduled, provided this delay is bounded by a small maximum delay T. For example, one can consider that for a voice connection a maximum 1.5 ms delay per node is affordable, when compared to the 100 ms maximum end-to-end delay that is usually agreed on. Under this assumption, the preemption granularity can be defined at a block level instead of a byte level. In other words, instead of imbedding an incoming real-time (RT) packet after the next byte of the non-real-time (NRT) packet being transmitted, one can schedule its transmission for the next block of data of the packet being transmitted.

On trunks that support preempt/resume protocol, each packet is transmitted along with at least a 1-byte trailer which is used to indicate whether the packet is preempted. Each preempt/resume transition is marked by the transmission of a X'7E' flag preceded by a 1-byte trailer.

NRT (and NR) packets are segmented into short blocks (N 0=128 bytes). The scheduler sends each block over the line after it has checked that the RT queue is empty. At T1 speed, the block length corresponds to a 0.7 microsecond transmission delay.

If a RT packet arrives after the transmission of a NR or NRT packet has started, the scheduler notices the presence of the RT packet at the next inter-block checking. It then inserts a 1-byte trailer into the current NR or NRT packet which indicates that this packet is going to be preempted by at least one RT packet, triggers the transmission of a X'7E' flag and inserts the RT packet.

After the RT packet has been transmitted, the scheduler inserts a 1-byte trailer which indicates that this packet was a RT packet, triggers the transmission of a X'7E' flag, and checks again the RT queue. If the RT queue is empty, the scheduler resumes the transmission of the NRT (or NR) packet. Else, it transmits the next RT packet and then inserts a new 1-byte trailer and a X'7E' flag.

Figure 2:
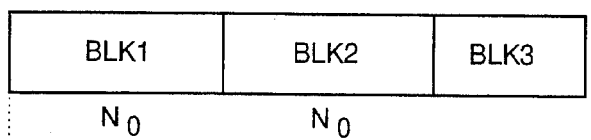
FIG. 2 represents the principle of the preempt/resume mechanism according to the invention.
Figure 2:
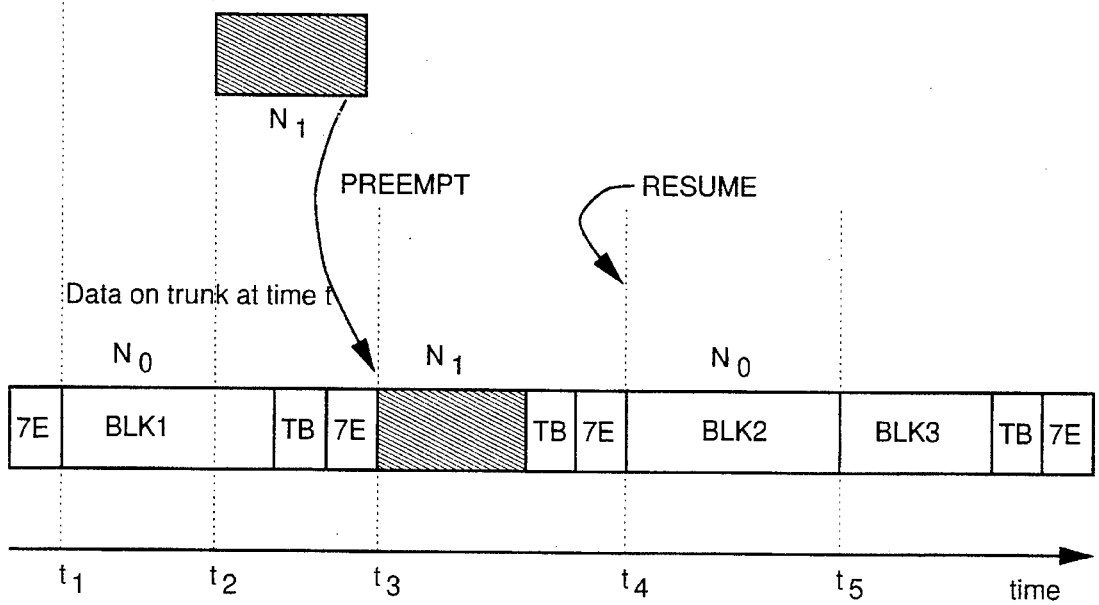

FIG. 2 shows the principle of the preempt/resume protocol. Assume that the transmission of a non-real-time packet has started at time $t=t_1$, and that a $N_1$ byte real-time packet arrives at time $t=t_2$. The real-time queue is checked before sending a new block of the non-real time packet, so in our example the preemption will be activated at time $t_3=t\ 1+T$. After the real-time packet has been transmitted, the transmission of the non-real-time packet is resumed by blocks of $N_0$ bytes.

The trailer byte actually includes: three state control bits that are used by the preempt/resume protocol; one reserved bit; and four other bits used for protection.

Figure 3:
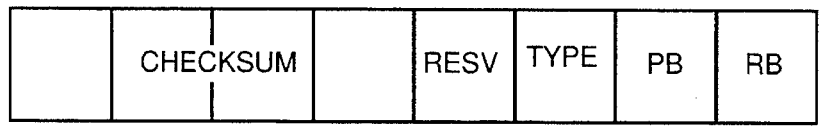
FIG. 3 represents the configuration of a trailer byte according to the invention.

FIG. 3 shows a trailer byte wherein:

| | |
|---|---|
| B0 to B3: | Trailer byte check sum. Equal to the inverted value of bits B4 to B7. |
| B4: | Reserved |
| B5: | PT (Packet Type) bit:<br>0  Real-Time<br>1  Non-real time/Non reserved |
| B6: | PB (Preempted Block) bit:<br>If B5=1 (meaning current clock has NRT packets), then<br>0  Current block is not preempted<br>1  Current block is preempted<br>If B5=1 (meaning current block has RT packets), then<br>0  Not applicable<br>1  Always inserted RT packet |
| B7: | RB (Resumed Preempt) bit:<br>NRT (B5=1)<br>0  Current block is not resumed<br>1  Current block is resumed<br>RT (B5=0)<br>0  Not last RT packet; next = RT<br>1  Last RT packet; next = NRT |

Instead of using 4 parity bits, one could use an error correcting code which would correct all single errors in a trailer byte.

The different Preempt/Resume sending sequences will now be described with reference to FIGS. 4–10.

Figure 4:
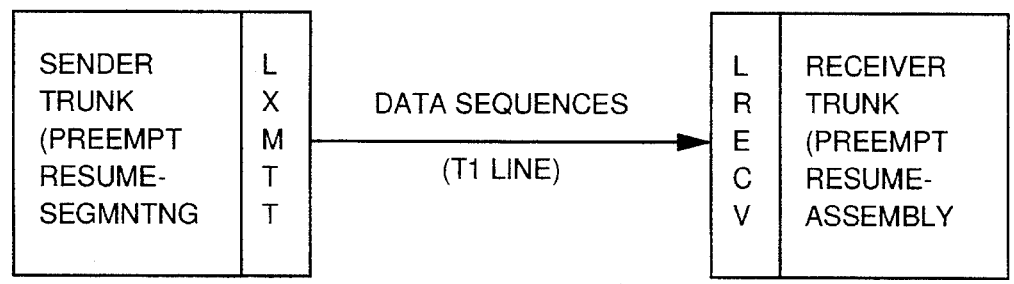
FIG. 4 shows a point to point T1 line connection.

The data sequences described hereafter are those generated at the transmit side (sender trunk) then received at the other side (receiver trunk) through a point to point T1 line connection, as shown in FIG. 4.

In the following text and figures:

NRT stands for non-real-time and non-reserved types of data packets;

TB stands for Trailer Byte;

TXXX represents the last three bits of the Trailer Byte with X being 1 or 0 per the previous description.

F stands for X'7E' delimiter flag; and

Figure 5:
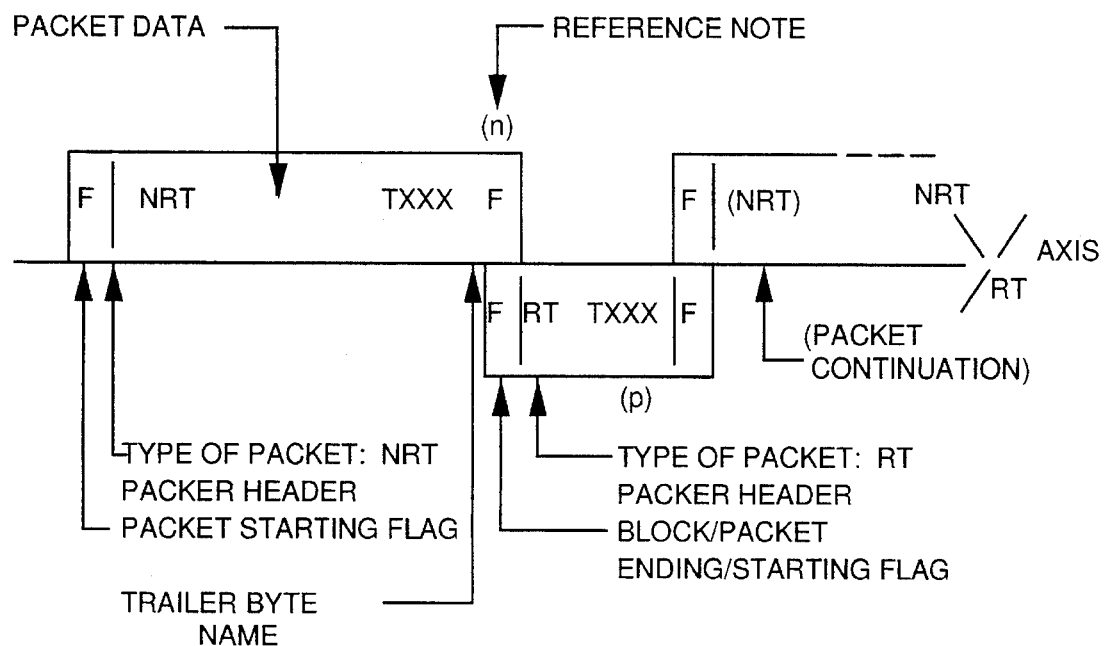
FIG. 5 is a model of the different transmit sequences.

Data sequence models are represented according to the model of FIG. 5

All possible sending sequence types generated by the sender are:

Single NRT packet not preempted;

Single RT packet not inserted;

Preempted NRT packet, single preemption with one RT packet insertion;

Preempted NRT packet, single preemption with several RT packets insertion; and

Preempted NRT packet, multiple preemption.

Figure 6:
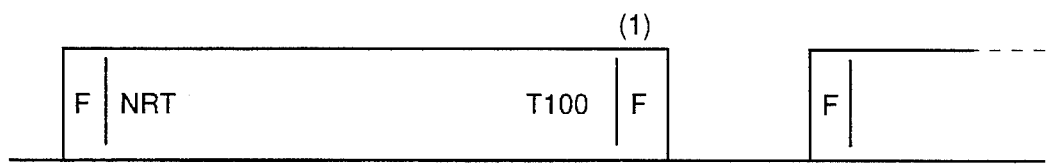
FIG. 6 to 10 are different transmit sequences.

The sequence of FIG. 6 represents a Single NRT packet, where T100 TB means: NRT complete packet, i.e. not preempted, not resumed.

Figure 7:
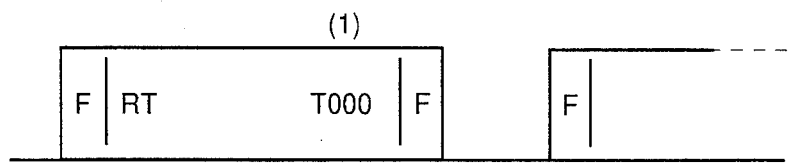

The sequence of FIG. 7 represents a Single RT packet where T000 TB means: RT packet, not inserted.

Figure 8:
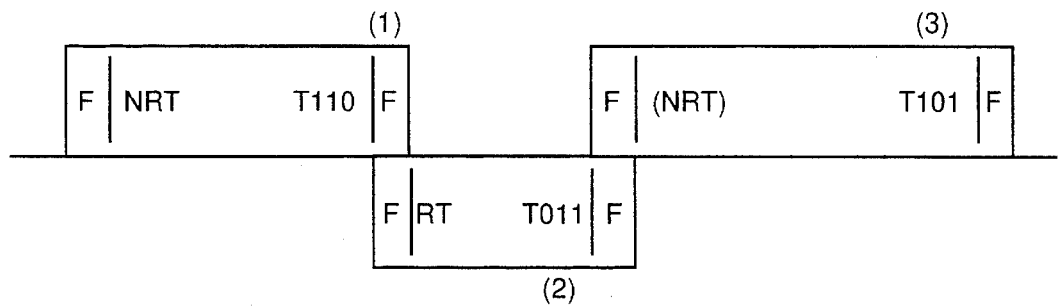

The sequence of FIG. 8 represents a NRT packet preempted once with one inserted RT packet, where T110 TB means: NRT, preempted, first block of packet, T011 TB means: RT packet, inserted, followed by a NRT block, T101 TB means: NRT, resumed, last block of packet.

Figure 9:
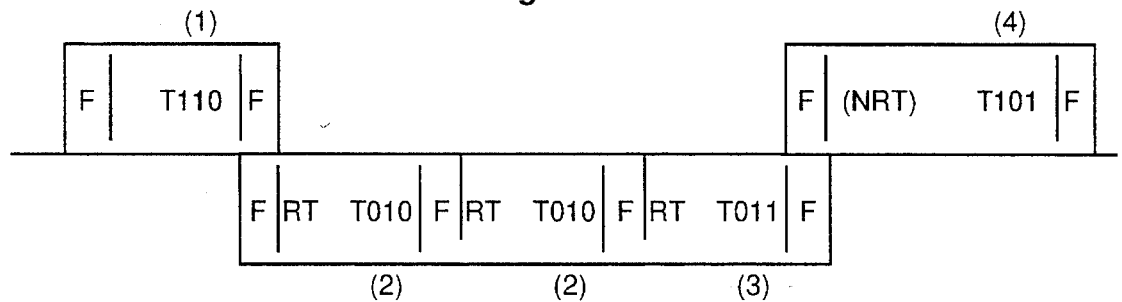

The sequence of FIG. 9 represents a NRT packet preempted once with several inserted RT packets, where T110 TB means NRT, preempted, first block of packet, T010 TB means RT packet, inserted, followed by another RT packet, T011 TB means RT packet, inserted, followed by a NRT block, T101 TB means NRT, resumed, last block of packet.

Figure 10:
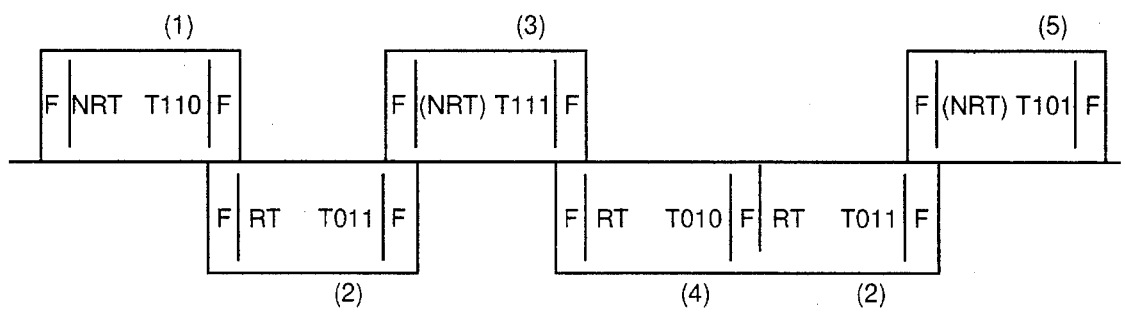

The sequence of FIG. 10 represents a NRT preempted several times (several inserted RT packets), where T110 TB means: NRT, preempted, first block of packet, T011 TB means: RT packet, inserted, followed by a NRT block, T111 TB means: NRT, preempted, resumed, middle block of packet. T010 TB means: RT packet, inserted, followed by another RT packet T011 TB means: RT inserted, followed by a NRT block, T101 TB means: NRT, resumed, last block of packet.

Figure 11A:
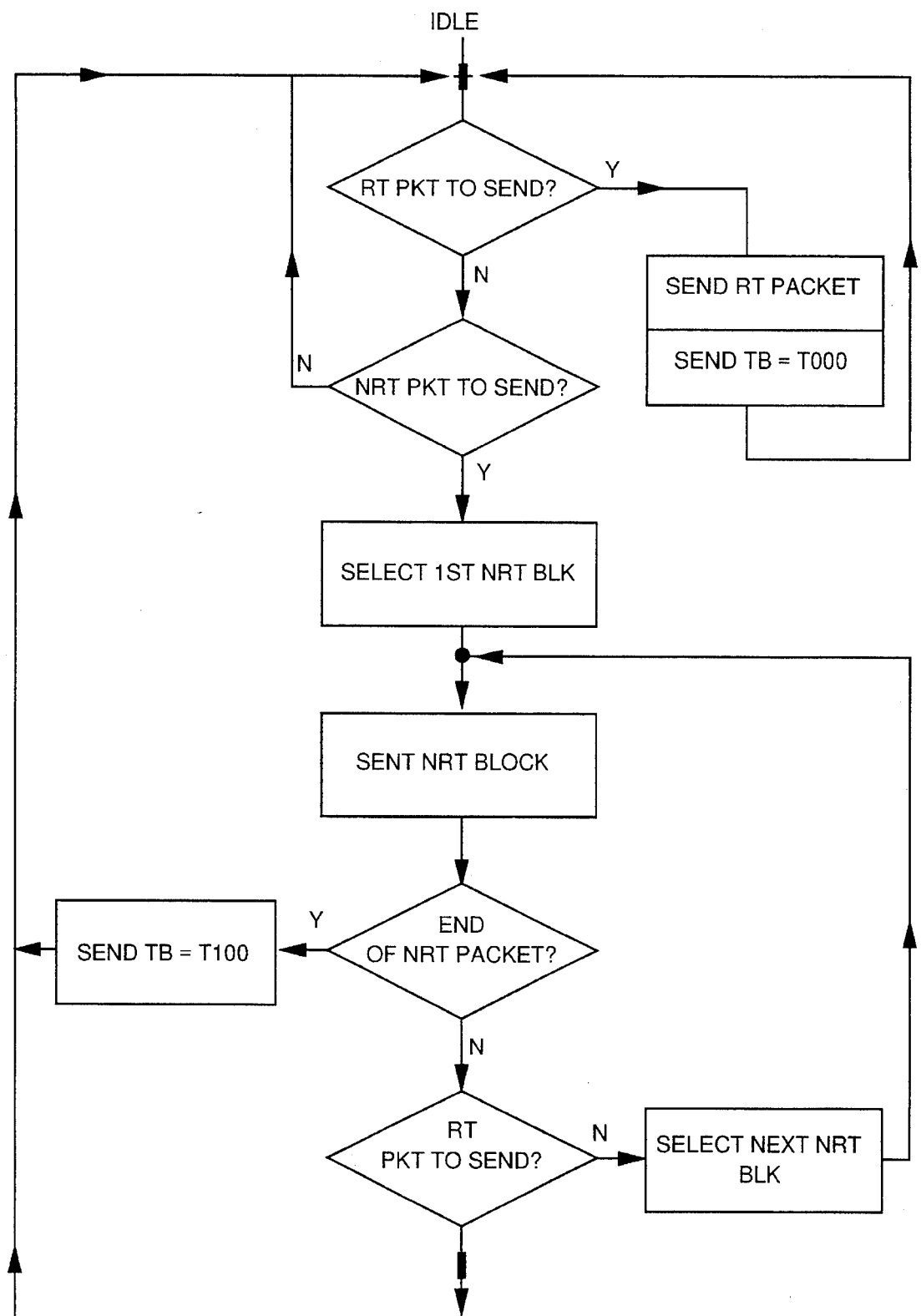
FIG. 11 is a Preempt/Resume Transmit flow diagram.
Figure 11B:
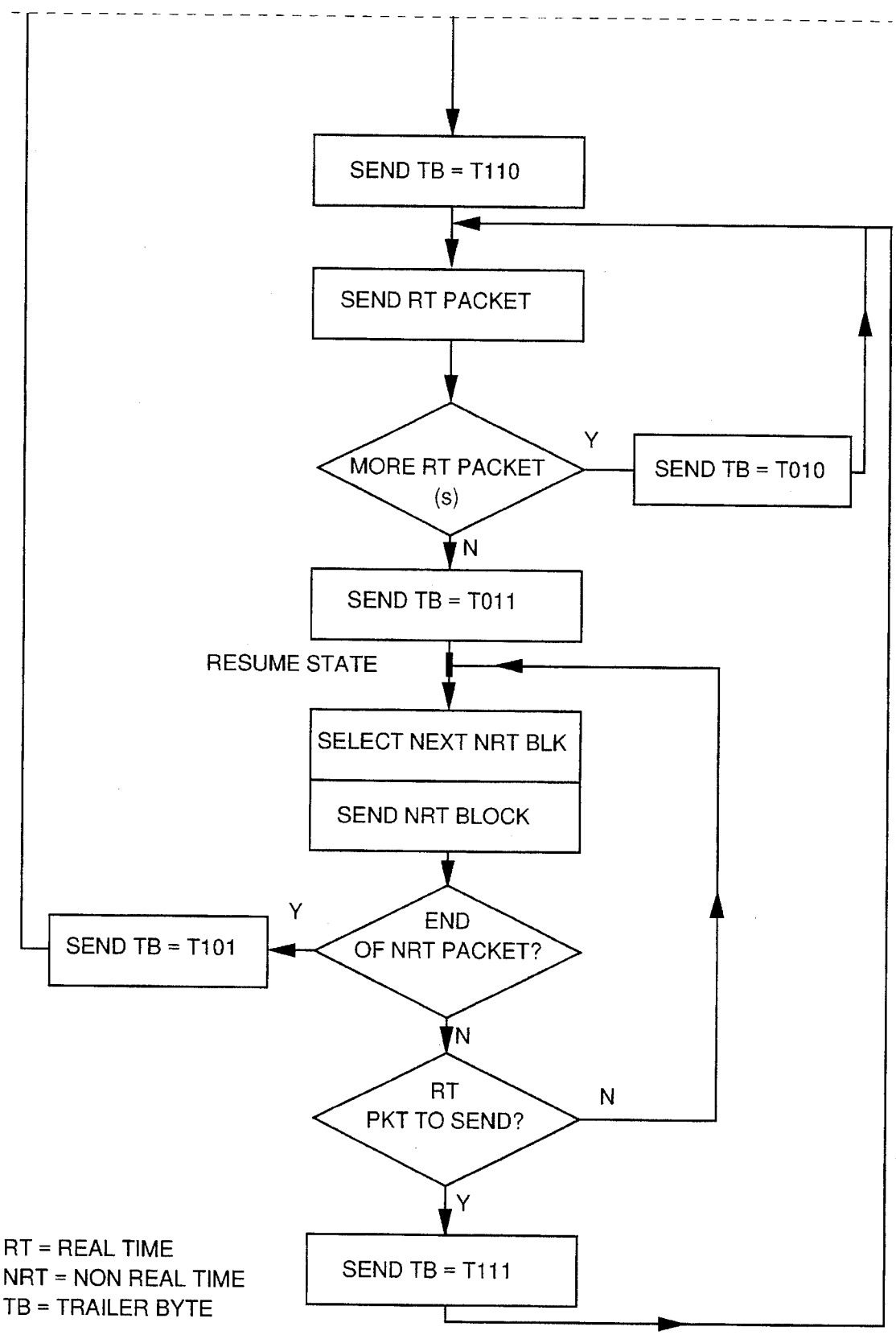
Figure 12A:
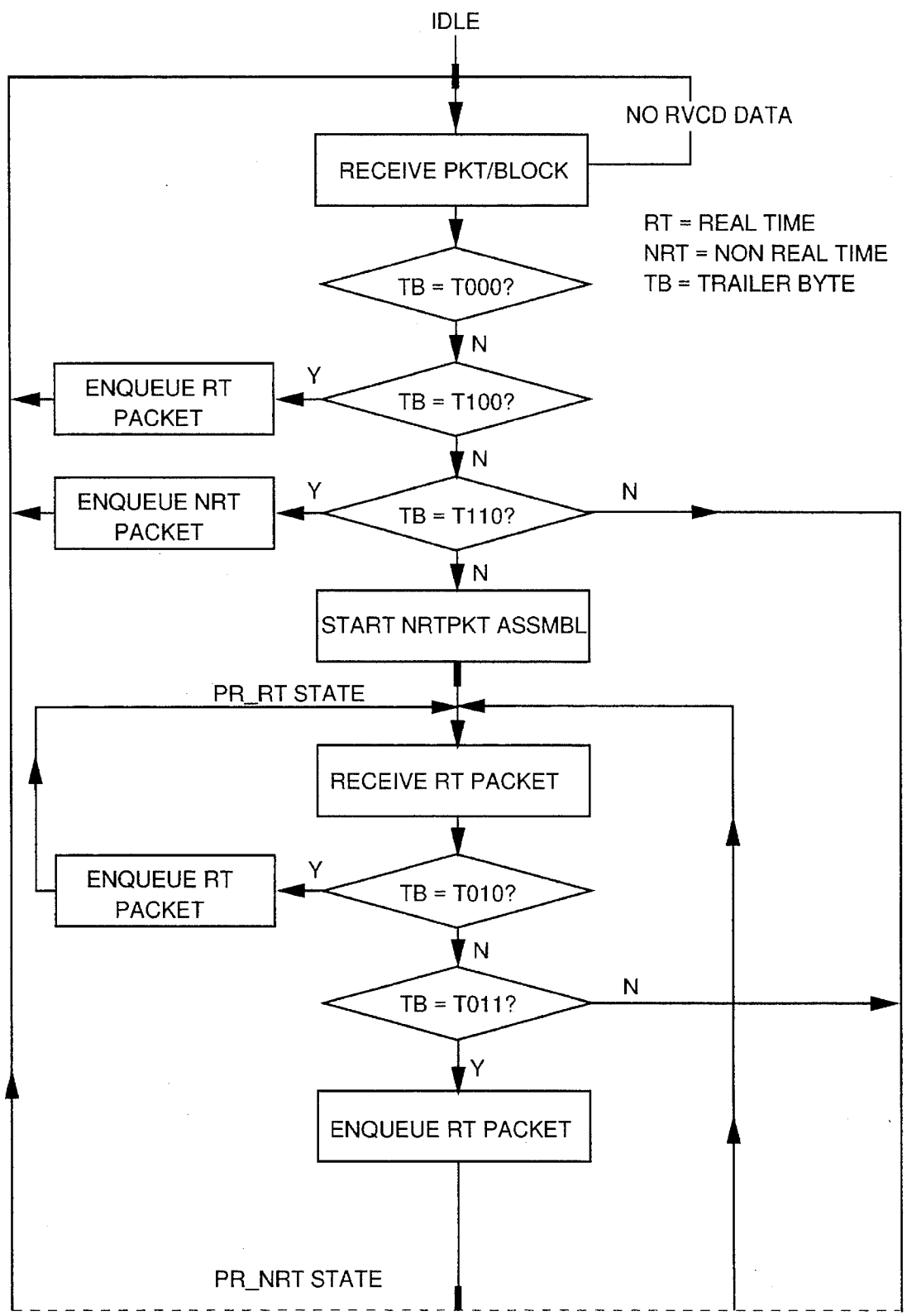
FIG. 12 is a Preempt/Resume Receive flow diagram.
Figure 12B:
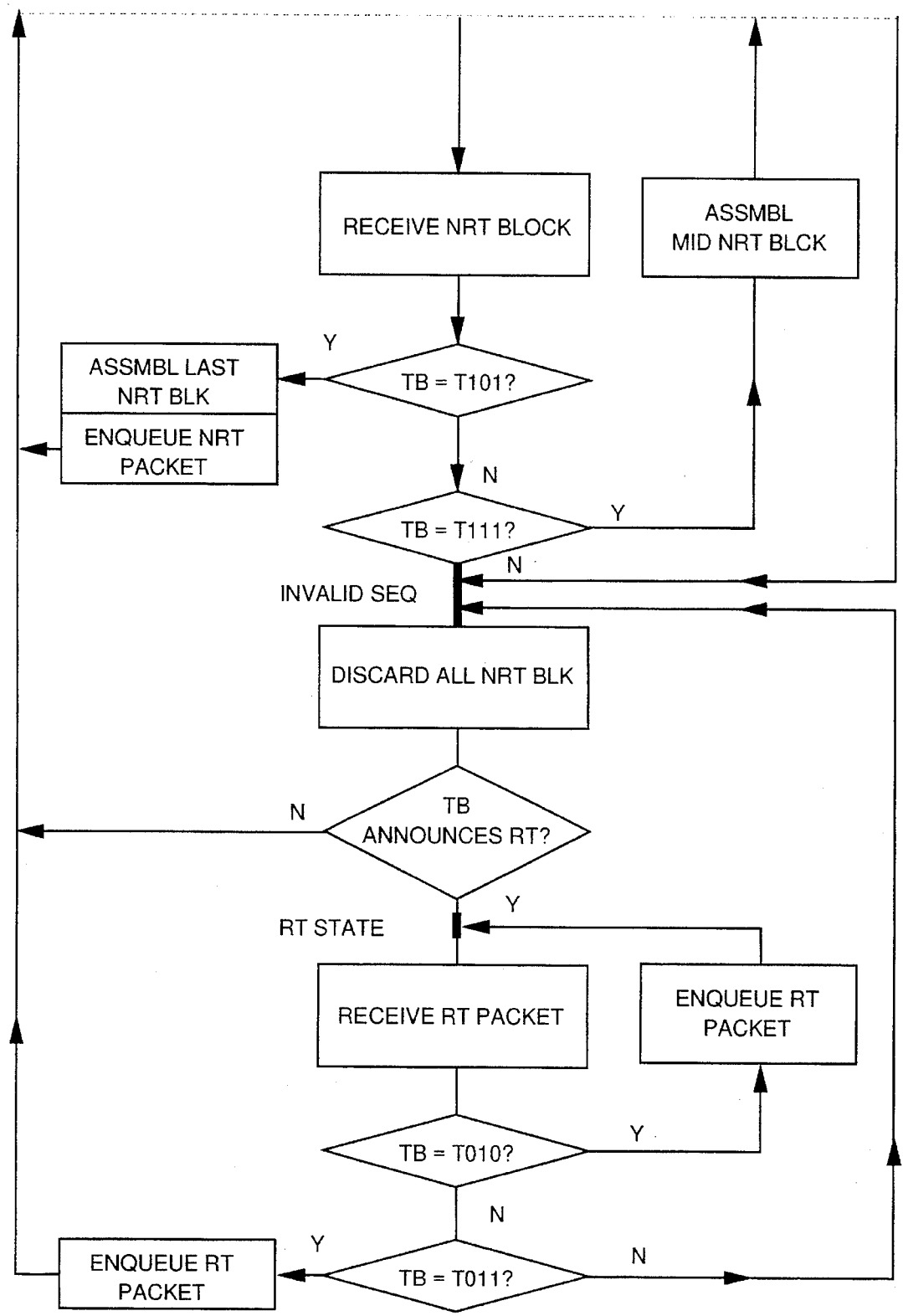

FIGS. 11 and 12 show the Preempt/Resume Transmit and Preempt/Resume Receive flow diagrams, respectively.

In these flow diagrams, a block always references a part of a NRT packet. A NRT block size is determined at the transmission side at the time the currently transmitted NRT packet is preempted.

A preempted NRT packet is reconstructed at the receive side by concatenating NRT blocks of the same packet, received consecutively, starting with the first block, continuing with the middle block(s) if any, and terminating with the last block. First, middle and last block indications are derived from the state control bits of the Trailer Byte of each block.

A Packet references
1. A single RT packet. This type of packet is never segmented
2. A single NRT packet i.e. a non preempted packet.

In the case of a receiving sequence error, all blocks of the same NRT packet, accumulated since the first one has been received, AND the latest received block/packet are discarded.

A valid Trailer byte means the received block/packet is apparently correct:
  good X'7E' flag alignment,—check sum field of the Trailer byte validates the whole byte.

In this case the information provided by the Trailer byte is considered as good. Thanks to this information the type of the next block/packet to be received may be predicted.

An invalid Trailer byte causes the received block/packet to be discarded. The type of the next block/packet to be received cannot be predicted.

The different states characterizing the system at the receive side are shown on FIG. 12:

IDLE state.
This is the default state, entered at initialization time and when receiving no data from the line. IDLE state is left when receiving a first valid preempted NRT data block.

PR-RT state.
This state means the preempt-resume process has been started or is in progress. PR-RT state is entered at the end of the reception of a valid first NRT block at IDLE state or at the end of the reception of a valid middle NRT block at $PR_{13}$ NRT state. A RT packet is expected. The Trailer byte of any valid received RT packet indicates the following expected data is either another RT packet or a resumed NRT block. In the case of a resumed NRT block, PR_NRT state is entered.

PR_NRT state.
This state means the preempt-resume process is in progress. PR_NRT state is entered at the end of the reception of a valid last RT packet at PR-RT state. NRT block is then expected. Two cases can occur:
  A middle NRT block is received, i.e. next expected data is a RT packet then the PR-RT state is entered.
  A last NRT block is received, i.e. terminating the NRT packet accumulation then IDLE state is entered.

RT state.
This state means the preempt-resume should be in progress. PR-RT state has been entered from any other state where an unexpected block/packet has been received with a valid trailer byte. This state allows the recovery of valid RT packets from a corrupted preempt/resume sequence (ex altered X'7E' end flag of a block/packet). RT state is left and IDLE state is entered as soon as a last RT packet or any non valid block/packet is received.

Figure 13:
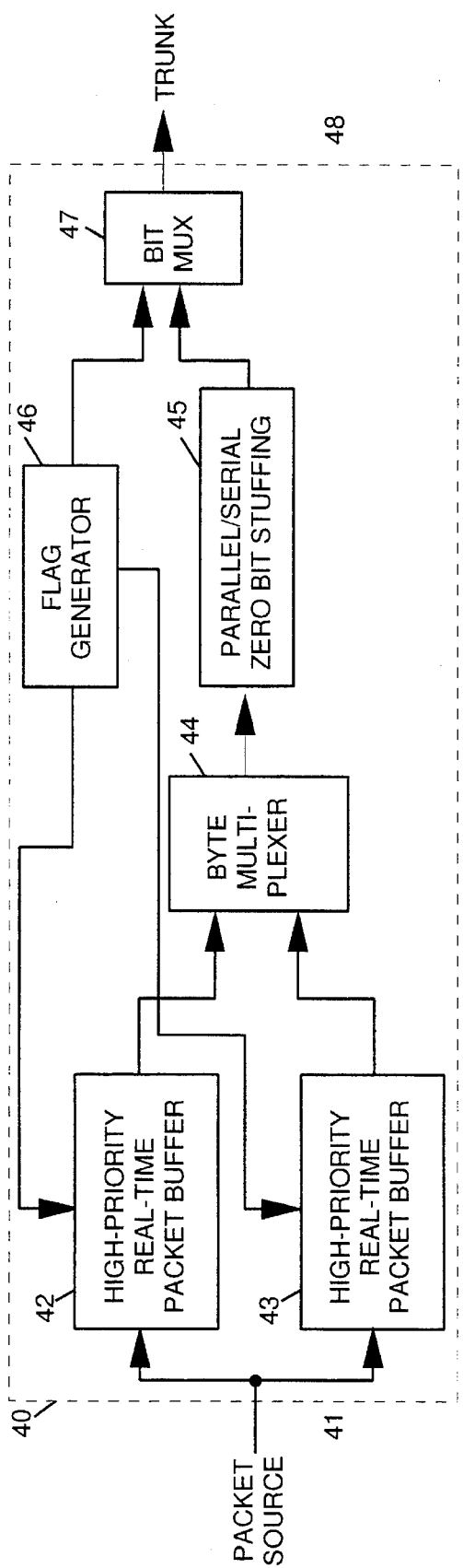
FIG. 13 is a block diagram of the transmit portion of a trunk interface of a communication system to which the invention is applicable.

FIG. 13 shows a block diagram of the transmitter 40 portion of the trunk interface of that communications system. Packets arrive from the communications system's packet source 41 for transmission on communication link 48. The packets may have been generated locally by this system or may have been received from another trunk on this system (e.g. an intermediate node in a packet net work). The communications system places the high-priority packets into a high priority buffer 42 and places the low-priority packets into a low priority buffer 43. If no packets are stored in either high priority buffer 42 or low priority buffer 43, a flag generator 46 is connected to the communication link 48 via a bit multiplexer 47. The flag generator 46 repeatedly generates an idle flag X'7E', when no packets are stored for transmission.

When a low-priority packet arrives in the low priority buffer 43 and a packet is currently being transmitted, the transmitter 40 waits until all earlier packets in the low priority buffer 43 have been transmitted and the high priority buffer 42 is empty. When a low-priority packet is at the head of the low priority buffer 43 and no other packet is being transmitted on the communication link 48, bytes from the low priority buffer 43 are transferred one at a time through a byte multiplexer 44 to a parallel/serial converter 45. The parallel/serial converter 45 serializes the data and monitors the outgoing data for sequences of five consecutive '1' bits. It also inserts a single '0' bit immediately after each set of five '1' bits. The resulting bit stream is routed through the bit multiplexer 47 the communication link 48. When the transmission of the low-priority packet is complete, the bit multiplexer 47 selects the flag generator 46 for transmission of one or more normal flags until the next packet is ready to be transmitted. Note that each time a flag is sent, the parallel/serial converter 45 resets its internal count of the number of consecutive '1' bits.

If a low-priority packet is being transmitted from low priority buffer 43 and a high-priority packet arrives in the high priority buffer 42, then the transmission of the low-priority packet is preempted. The remaining bits in the parallel serial converter 45 along with any stuffed zero bits are transmitted guaranteeing a block boundary for the preempted packet. Then the flag generator 46 sends a trailer byte, as described earlier and an idle flag X'7E'. Bytes from the high priority buffer 42 are then transferred through the byte multiplexer 44 to the parallel/serial converter 45 which performs serialization and zero bit stuffing. The resulting high-priority packet is then transferred to the communication link 48. If, during the transmission of the high-priority packet, another high-priority packet arrives in the high-priority buffer 42, then the flag generator 46 sends a trailer byte and an idle flag when the first high-priority packet is completed and transmitter 40 begins transmission of the next high-priority packets without exiting the preempt mode. When the last of the series of high-priority packets has been sent (there are not more packets waiting in the high priority buffer 42), the flag generator 46 sends again a trailer byte and an idle flag. The remaining bytes from the preempted low-priority packet in the low priority buffer 43 are released to the parallel/serial converter 45 and the communication link 48. If a subsequent high-priority packet arrives at the high-priority buffer 42 prior to the completion of the preempted low-priority packet, the preemption and resume sequence is repeated. When the transmission of the low-priority packet is completed, the flag generator 46 transmits an idle flag.

Figure 14:
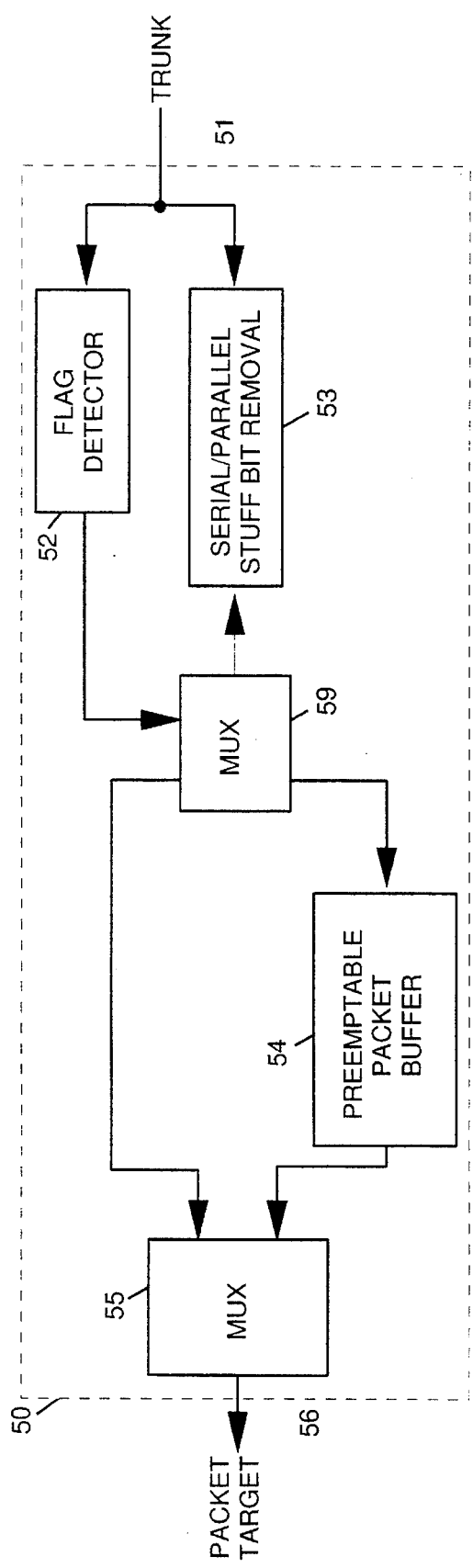
FIG. 14 is a block diagram of the receive portion of a trunk interface of a communication system to which the invention is applicable.

FIG. 14 shows a block diagram of the receiver 50 portion of the communication link interface of the communications system up to a point at which received whole packets are passed to a packet target 56 within the communications system. The packet target 56 could be the final destination for the received packets or could be a packet switch used to route packets to other trunks for transmission to other nodes in a packet network. Any buffering associated with the packet target 56 is outside the receiver 50 and is not included in FIG. 14.

A flag detector 52 continuously monitors the bit stream received from a communication link 51 trailer byte and idle flags. If a sequence of bits other than a flag is detected immediately following an idle flag, it indicates the beginning of a new frame. A serial/parallel converter 53 receives the bit stream, discards any '0' bit if it immediately follows five consecutive '1' bits, and converts the remaining bits into byte-parallel form. If the received packet is a high-priority , packet, the parallel byte data is passed directly through a multiplexer 59 to a multiplexer 55 connected to the packet target 56 until a normal ending flag is detected by the flag detector 52. The receiver 50 indicates the end of the packet to the packet target 56. If the received packet can be preempted (i.e. low-priority, non-real-time packet), then the parallel byte data is instead passed through byte multiplexer 59 to the preemptable packet buffer 54 in order to permit the entire packet to be accumulated before passing it to the packet target 56. If flag detector 52 detects a trailer byte that there is no partial byte in the serial parallel converter 53, then it indicates the beginning of a high-priority preempting packet and therefore the beginning of preempt mode. The bit stream is passed through the serial/parallel converter 53 as before but this time the parallel byte data is passed directly through the multiplexers 59 and 55 to the packet target 56 within the communications system.

When the flag detector 52 detects either a normal ending flag or a trailer byte indicating the end of preemption, then the receiver 50 indicates the end of the packet to the packet target 56. If a normal ending flag is detected, then the serial/parallel converter 53 will continue to route the parallel byte data from subsequent packets directly to the multiplexer 55. If a trailer byte indicating the end of preemption is detected, the receiver 50 will end preempt mode. The received bit stream will be routed through the serial parallel converter 53 and multiplexer 59 to the preemptable packet buffer 54 thus resuming reception of the preempted low-priority packet. If the flag detector 52 detects a normal ending flag indicating the end of the low-priority packet, the receiver 50 transfers the entire low-priority packet stored in the preemptable packet buffer 54 through the multiplexer 55 to the packet target 56.

We claim:

1. For use in a data packet communication system having nodes and links between nodes for transporting low-priority packets in blocks of one or more bytes and high-priority packets, a priority-responsive packet handling system at one or more of the nodes, said packet handling system including:

a) priority packet detector for determining whether a high-priority packet is ready to be transported;
   b) packet preempt/resume logic for determining whether data currently being transported is a high-priority packet which preempted a low-priority packet block or a low-priority packet block which is to be preempted by a following high-priority packet or which has been resumed following an earlier preemption by a high-priority packet;
   c) a trailer generator receiving outputs from said said priority packet detector and said packet preempt/resume logic for generating a multi-bit trailer having a bit pattern indicating the packet type of the current data and the preempt/resume status of such current data.

2. A packet handling system as set forth in claim 1 further including:

a) packet insertion logic responsive to an output from the priority packet detector for inserting a high-priority packet into the data being transported following a current block of low-priority data or following a current high-priority packet;
   b) a packet buffer for temporarily storing a low-priority packet block which has been preempted by a high-priority packet; and
   c) resume logic responsive to a predetermine bit pattern in a trailer in a high-priority packet currently being transported to resume transport of a low-priority packet block temporarily stored in said packet buffer.

3. A packet handling system as set forth in either of claims 1 or 2 further including receiver logic for processing data received over a link to another node, said receiver logic including:

a) a trailer detector for determining the status of each of the bits in a trailer in data currently being received;
   b) detection logic responsive for outputs from the trailer detector for identifying data currently being received either as a high-priority packet or a block of low-priority data and, where the data is identified as a block of low-priority data, for identifying whether the block is an initial, an intermediate or a final block of data in a low-priority packet.

4. A packet handling system as set forth in claim 3 further including a receive buffer for buffering one or more blocks of low-priority data when such data has been preempted by high-priority packets.

5. A packet handling system as set forth in claim 4 further including means responsive to outputs from the detection logic for reassembling a low-priority data packet from one or more blocks either currently being received or stored in the receive buffer.

6. For use in a data packet communication system having nodes and links between nodes for transporting low-priority packets in blocks of one or more bytes and high-priority packets, a method of interleaving high-priority data with low-priority data, said method comprising the steps of:

a) determining whether the data currently being transported is a block of low-priority data or a high-priority packet;
   b) detecting the presence of a high-priority packet awaiting transport;
   c) where the data currently being transported is a block of low-priority data, determining whether the block is part of a low-priority packet that had previously been preempted to permit at least one high-priority packet to be transported;
   d) generating a trailer byte having bit patterns identifying the priority of the data currently being transported and, where the data is part of a low-priority packet, whether it is to be preempted to permit transport of a waiting high-priority packet; and
   e) inserting the trailer byte into a predetermined position relative to the data currently being transported.

7. A method as set forth in claim 6 wherein the trailer byte is inserted at the end of a block of low-priority data or at the end of a high-priority packet.

8. A method as set forth in claim 7 including the additional steps of:

a) temporarily storing those blocks of a low-priority packet which have yet to be transported while one or more preempting high-priority packets are being transported; and b) resuming transport of the low-priority data when no further high-priority packets are awaiting transport.

9. A method as set forth in claim 8 including the additional steps of:

a) detecting the trailer byte in received data to determine whether the data represents a block of low-priority data or a high-priority packet and, where the data represents a block of low-priority data, whether that block is the initial, an intermediate or the final block of data in the low-priority packet;

b) temporarily storing any data which is found to be low-priority but not the final block of a low-priority packet;

c) when the final block of a low-priority packet is detected, reassembling the received blocks of low-priority data in appropriate order to reproduce the complete low-priority packet.

* * * * *